US011812701B2

(12) United States Patent
Flickinger et al.

(10) Patent No.: US 11,812,701 B2
(45) Date of Patent: Nov. 14, 2023

(54) TANGENTIAL FEEDING TO A THRESHING ROTOR

(71) Applicant: CNH Industrial America LLC, New Holland, PA (US)

(72) Inventors: Wayne Flickinger, Oxford, PA (US); Nicholas Estock, Mason, OH (US)

(73) Assignee: CNH Industrial America LLC, New Holland, PA (US)

( * ) Notice: Subject to any disclaimer, the term of this patent is extended or adjusted under 35 U.S.C. 154(b) by 593 days.

(21) Appl. No.: 16/980,993

(22) PCT Filed: Mar. 15, 2019

(86) PCT No.: PCT/US2019/022448
§ 371 (c)(1),
(2) Date: Sep. 15, 2020

(87) PCT Pub. No.: WO2019/178466
PCT Pub. Date: Sep. 19, 2019

(65) Prior Publication Data
US 2020/0404849 A1 Dec. 31, 2020

Related U.S. Application Data

(60) Provisional application No. 62/643,341, filed on Mar. 15, 2018.

(51) Int. Cl.
*A01F 7/04* (2006.01)
*A01F 12/16* (2006.01)

(52) U.S. Cl.
CPC ................ *A01F 7/04* (2013.01); *A01F 12/16* (2013.01)

(58) Field of Classification Search
CPC .. A01F 7/04; A01F 12/16; A01F 12/10; A01F 7/06
See application file for complete search history.

(56) References Cited

U.S. PATENT DOCUMENTS 3,626,472 A * 12/1971 Rowland-Hill ....... A01F 12/442
460/70
3,794,047 A * 2/1974 De Coene ................. A01F 7/06
460/73

(Continued)

FOREIGN PATENT DOCUMENTS

| EP | 1147701 A1 | 10/2001 | |
|---|---|---|---|
| EP | 3117698 A1 * | 1/2017 | ............. A01F 12/10 |
| HU | 216757 B * | 8/1999 | ............ A01F 12/442 |

OTHER PUBLICATIONS

International Search Report and Written Opinion for PCT application PCT/US2019/022448, dated Jun. 17, 2019 (12 pages).

*Primary Examiner* — Arpad F Kovacs
(74) *Attorney, Agent, or Firm* — Peter K. Zacharias

(57) ABSTRACT

A combine harvester includes a rotor cage surrounding a rotor, a threshing space defined between the rotor cage and the rotor, and a transition section defining an infeed to the rotor cage. The transition section is mounted to the rotor cage at a location upstream of the rotor cage. The transition section has an inlet for receiving the crop material. The harvester also includes a crop conveying drum for conveying crop material to the inlet of the transition section and beneath the rotor. The crop conveying drum is at least partially encased by a shroud. The transition section includes a bottom wall, two side walls each having lower portions extending substantially vertical with respect to the bottom wall, and curved side walls each extending between the bottom wall and one of the side walls. The bottom wall is substantially tangential to a lower portion of the shroud.

19 Claims, 11 Drawing Sheets

(56) References Cited

U.S. PATENT DOCUMENTS

| | | | | |
|---|---|---|---|---|
| 3,827,443 | A * | 8/1974 | Drayer | A01F 12/00 460/16 |
| 3,994,303 | A * | 11/1976 | Rowland-Hill | A01F 7/06 460/71 |
| 3,994,304 | A * | 11/1976 | Todd | A01F 7/06 460/70 |
| 4,209,024 | A * | 6/1980 | Powell | A01F 12/10 460/70 |
| 4,269,200 | A * | 5/1981 | Gorsler | A01F 12/10 460/68 |
| 4,291,709 | A * | 9/1981 | Weber | A01F 7/06 460/70 |
| 4,328,815 | A * | 5/1982 | Rowland-Hill | A01F 12/10 460/16 |
| 4,665,929 | A * | 5/1987 | Helm | A01F 7/06 460/67 |
| 4,875,890 | A * | 10/1989 | Margerum | A01F 7/06 460/68 |
| 5,145,461 | A * | 9/1992 | Tanis | A01F 12/10 460/68 |
| 5,257,959 | A * | 11/1993 | Tanis | A01F 12/10 460/68 |
| 5,344,367 | A * | 9/1994 | Gerber | A01F 12/10 460/68 |
| 6,050,894 | A * | 4/2000 | Johnson | A01F 7/06 460/68 |
| 6,129,629 | A * | 10/2000 | Dammann | A01F 12/442 460/80 |
| 6,544,118 | B2 | 4/2003 | Schwersmann | |
| 6,780,102 | B2 * | 8/2004 | Visagie | A01F 12/10 460/70 |
| 6,830,512 | B2 * | 12/2004 | Tanis | A01F 7/06 460/68 |
| 7,462,101 | B2 * | 12/2008 | Grywacheski | A01F 12/20 460/68 |
| 7,717,777 | B2 * | 5/2010 | Pope | A01F 7/067 460/69 |
| 8,118,652 | B2 * | 2/2012 | Hollatz | A01F 7/06 460/73 |
| 9,807,937 | B2 * | 11/2017 | Flickinger | A01F 12/24 |
| 10,420,285 | B2 * | 9/2019 | Flickinger | A01F 12/46 |
| 10,694,677 | B2 * | 6/2020 | Flickinger | A01F 7/067 |
| 2001/0054279 | A1 * | 12/2001 | Schwersmann | A01F 7/06 56/84 |
| 2002/0045469 | A1 * | 4/2002 | Schwersmann | A01F 7/06 460/68 |
| 2002/0086721 | A1 * | 7/2002 | Schwersmann | A01F 12/10 56/80 |
| 2004/0023703 | A1 * | 2/2004 | Tanis | A01F 7/06 460/68 |
| 2012/0100898 | A1 * | 4/2012 | Mygind | A01F 12/10 460/22 |
| 2014/0174049 | A1 * | 6/2014 | Ricketts | A01F 12/26 460/59 |
| 2017/0079212 | A1 * | 3/2017 | Bok | A01F 12/10 |
| 2017/0105350 | A1 * | 4/2017 | Ricketts | A01F 7/067 |

* cited by examiner

TANGENTIAL FEEDING TO A THRESHING ROTOR

FIELD OF THE INVENTION

The present invention relates to components for feeding crop material into a threshing system of a combine harvester.

BACKGROUND OF THE INVENTION

As is described in U.S. Pat. No. 6,830,512, which is incorporated by reference in its entirety, a well-known form of harvesting machine is a rotary combine. A typical combine includes a crop harvesting header assembly which reaps grain stalks and feeds the grain stalks to a rotary threshing assembly. The grain stalks or other crop materials harvested in the field are moved rearwardly from the crop harvesting header assembly by a crop feeding assembly and introduced for threshing to the rotary threshing and separating assembly.

In a rotary combine, the rotary threshing and separating assembly includes a generally tubular rotor housing mounted in the combine body. A driven rotor is coaxially mounted within the housing. The rotor comprises a frusto-conical infeed section and a cylindrical threshing and separating section, and is supported at opposite ends by front and rear bearings.

The cylindrical threshing and separating section of the rotor, and its surrounding rotor housing, mount cooperating threshing elements which thresh grain from other material in a threshing zone. The crop material is threshed and separated as it spirals around the rotor threshing section, and separated grain passes through openings in the surrounding rotor housing.

As discussed in U.S. Pat. No. 5,387,153, which is also incorporated by reference herein in its entirety, the ability to transfer crop materials from the feeder assembly to the threshing zone of the rotor assembly is critical to efficient combine operations. Most rotary combine rotors include an infeed section impeller comprised of a series of impeller blades arranged at a forward end of the rotor. The impeller blades rotate within a shroud which is a forward part of the rotor housing. During harvesting operations, the generally linear movement of the crop materials received from the feeder assembly is converted by the rotating impeller blades into a rotating, circulatory movement, in a rearward and outward direction.

The present application relates specifically to the structure and arrangement of the shroud and the feeder assembly in the interests of effectively and efficiently transitioning crop material from the feeder assembly to the threshing zone of the rotor assembly.

SUMMARY OF THE INVENTION

According to one aspect of the invention, an agricultural combine harvester comprises a rotor cage surrounding a rotor and a threshing space defined between the rotor cage and the rotor. A transition housing defines an infeed to said rotor cage. The transition section being disposed at a location upstream of the rotor cage, as viewed in a direction of crop flow through the combine harvester. The transition section has an inlet for receiving the crop material. A crop conveying drum is provided for conveying crop material to the inlet of the transition section and beneath the rotor. The crop conveying drum is at least partially encased by a shroud. The transition housing comprises a bottom wall, two side walls each having portions extending substantially vertical with respect to the bottom wall, curved side walls each extending between the bottom wall and one of the side walls, and a conical top wall extending between and connecting the curved side walls. The bottom wall is substantially tangential to a lower portion of the shroud located beneath the crop conveying drum.

According to another aspect of the invention, a threshing system of an agricultural combine harvester comprises a rotor cage surrounding a rotor, a threshing space defined between the rotor cage and the rotor, and a transition section defining an infeed to said rotor cage. The transition housing being disposed at a location upstream of the rotor cage, as viewed in a direction of crop flow through the combine harvester. The transition section has an inlet for receiving the crop material from a crop conveying drum of the agricultural combine harvester. The transition housing comprises a bottom wall, two side walls each having portions extending substantially vertical with respect to the bottom wall, curved side walls each extending between the bottom wall and one of the side walls, and a conical top wall extending between and connecting the curved side walls.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

The invention, including its construction and method of operation, is illustrated more or less diagrammatically in the drawings, in which.

DETAILED DESCRIPTION OF THE INVENTION

Figure 1:
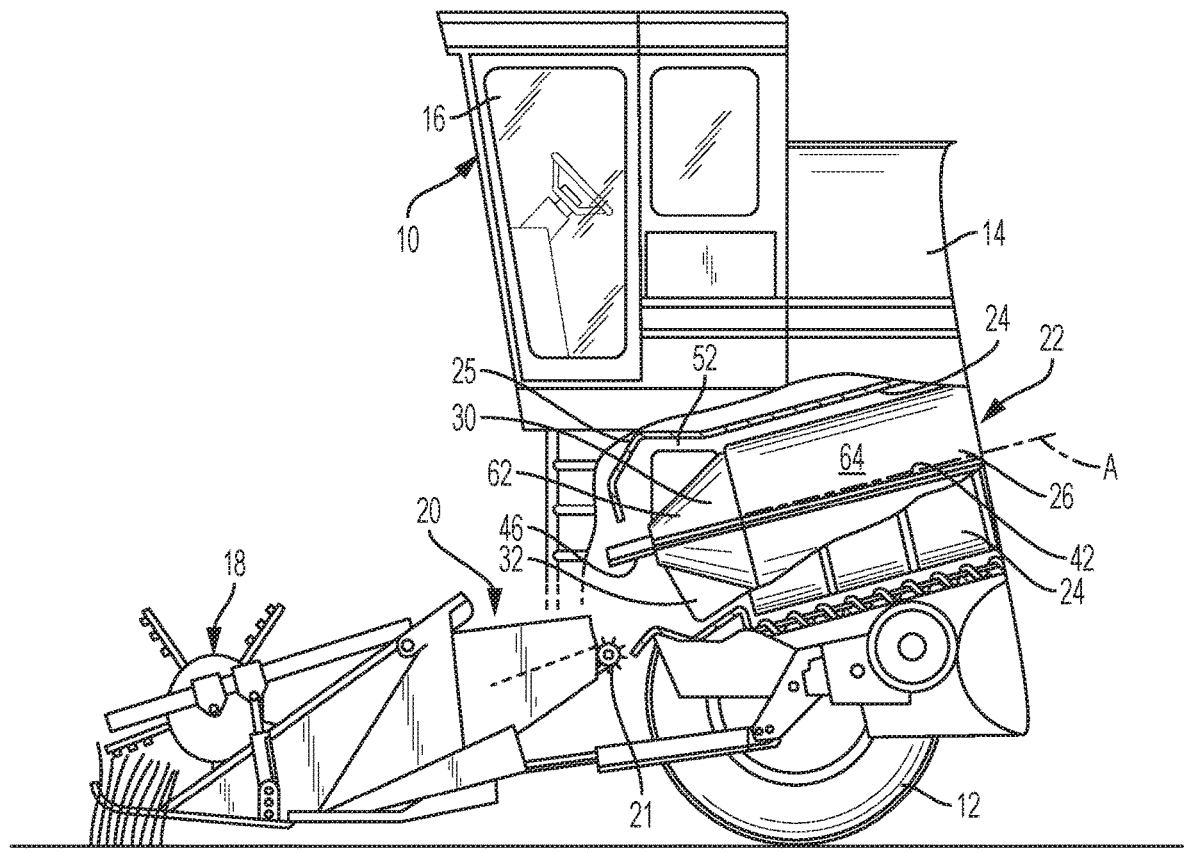
FIG. 1 is a side elevational view of a portion of a typical rotary combine showing, in partial section, a crop feeding assembly and a rotor assembly including a rotor housing with an impeller shroud.

Corresponding reference characters indicate corresponding parts throughout the several views. The exemplification set out herein illustrates an embodiment of the invention, in one form, and such exemplification is not to be construed as limiting the scope of the invention in any manner.

The terms "upper", "lower", "fore", "aft," "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "upstream" and "downstream" are determined with reference to the direction of movement of crop material through the agricultural harvester.

Referring now to the drawings, and particularly to FIG. 1, a typical self-propelled rotary combine is seen generally at 10. The combine 10 includes a body 14 supported by front wheels 12 (the rear wheels are not shown). The combine 10 also includes an operator's station 16.

The combine 10 is powered by an engine (not shown), suitably supported within the body 14. The transfer of power from the engine to various driven components of the combine is effected conventionally.

The combine 10 is provided with a crop harvesting header assembly 18 for cutting and gathering crop materials. The header assembly 18 cuts and directs crop materials into a crop feeding assembly 20, including a crop conveying drum 21. The crop conveying drum 21 carries crop materials in a layer or mat toward a rotor assembly 22, which receives and threshes the grain from materials other than grain (MOG), as is known in the art.

The rotor assembly 22 is supported in a conventional manner inside the body 14. The rotor assembly 22 includes a cylindrical rotor housing 24 comprising a rotor cage, concaves and grates (concaves and grates are not shown) mounted in a fore-and-aft direction in the body 14, and a rotor 26 is rotatably mounted coaxially within the rotor housing 24.

The rotor 26 is a hollow drum rigidly affixed to a shaft 42 extending coaxially therethrough. The rotor 26 includes an infeed section 62 and a threshing section 64. The infeed section 62 comprises an impeller 30 including a cone-shaped impeller body having impeller blades 32 extending outwardly therefrom.

The shaft 42 supports the rotor 26 for rotation with the shaft on the axis A. The shaft 42 is rotatably supported in the combine body 14 at its front end in a bearing assembly 46.

At its forward end, the rotor housing 24 includes an impeller shroud 25. The shroud 25 partially encloses the impeller 30 and cooperates with it in feeding the crop material axially, radially and circumferentially into the threshing section 64. The shroud 25 encloses the impeller 30 circumferentially and over a portion of its front end. The shroud 25 is connected (e.g., welded or bolted) to the cylindrical rotor housing 24, at the rear of the shroud.

A narrow, annular space 52 is defined between the outer edges of the impeller blades 32 and the inner surface of the adjacent shroud 25. As the impeller 30 rotates it moves crop material rearwardly toward the threshing section 64 through the space 52.

FIGS. 2-7B depict a crop feeding assembly 110 and a rotor assembly 120 of a combine according to one exemplary embodiment of the invention. The portion of the combine shown in FIGS. 2-7B is related to the combine shown in FIG. 1 and various differences between those combines will be described hereinafter.

Referring now to the individual components of the crop feeding assembly 110, the crop feeding assembly 110 includes a crop conveying drum 111 that is at least partially enclosed by a shroud comprising an upper shroud 113 and a lower shroud 114.

The drum 111, which is analogous to the drum 21, may be referred to in the art as a rock beater or a feeder. An exemplary rock beater is described in U.S. Patent Application Publ. No. 2002/0016192, which is incorporated by reference herein in its entirety. The drum 111 is a rotating cylindrical body having a plurality of blades 112 on its outer surface for conveying crop material through the crop feeding assembly 110. In operation, the drum 111 rotates about its axis in a counterclockwise direction (as viewed from the perspective of FIG. 2), and the blades 112 propel crop material into the inlet 135 of the rotor assembly 120.

The drum 111 is mounted within a shroud or housing comprising the upper shroud 113 and the lower shroud 114 that is positioned beneath the upper shroud 113. A gap exists between the drum 111 and the lower shroud 114 through which crop material can pass. Although not shown, side walls are coupled between the shrouds 113 and 114 to form a complete shroud unit.

The upper shroud 113 is a curved sheet metal plate (for example) having a central axis that is coincident with the axis of rotation of the drum 111. The upper shroud 113 could also be a flat sheet. The body of the upper shroud 113 is curved in the longitudinal (fore-aft) direction, and is straight in a transverse direction. The upper shroud 113 is mounted above the drum 111 and below the axis 'B' of rotation of the rotor assembly 120. Alternatively, the upper shroud 113 could be mounted above the axis 'B.' The upper shroud 113 extends the entire length of the drum 111 (the length dimension extends into the page).

The lower shroud 114 is also a curved sheet metal plate (for example) having a central axis that is coincident with the axis of rotation of the drum 111. The body of the lower shroud 114 is curved in the longitudinal direction, and is straight in the transverse direction. The lower shroud 114 is mounted beneath the drum 111. The lower shroud 114 extends the entire length of the drum 111.

A rock sump 119, in the form of a depression, is positioned upstream of the lower shroud 114. The sump 119 is both positioned and configured for collecting rocks expelled by the blades 112 of the rotating drum 111 before the rocks can reach the rotor assembly 120. The sump 119 is an optional feature of the crop feeding assembly 110.

The upstream end 123 of the lower shroud 114 is positioned forward of the rotational axis of the drum 111, and beneath the rotational axis B of the rotor assembly 120. The downstream end 124 of the lower shroud 114 is positioned rearward of the axis of the drum 111 and beneath the rotational axis B of the rotor assembly 120. The downstream end 124 is also positioned at an elevation above the upstream end 123, such that the lower shroud 114 is tilted upward as viewed in a rearward direction. Alternatively, the lower shroud 114 could be oriented horizontally.

The downstream end 124 of the lower shroud 114 is connected to the lower, upstream end 125 of the rotor housing 128 such that a smooth surface transition is formed from the upper surface of the lower shroud 114 to the upper surface of the rotor housing 128. Stated differently, the upstream end 125 of the rotor housing 128 is positioned tangentially to the downstream end 124 of the lower shroud 114. It is also noted that the downstream end 124 of the lower shroud 114 is positioned beneath the rotor 126.

Referring now to the features of the rotor assembly 120, the rotor assembly 120 includes the rotor 126 (analogous to the rotor 26 described above) having an impeller 127 at its forward end, and a rotor housing 128 (analogous to the rotor housing 24) at least partially surrounding the rotor 126. The swept profile of the rotor 126 and the impeller 127 is shown in FIG. 2.

Figure 2:
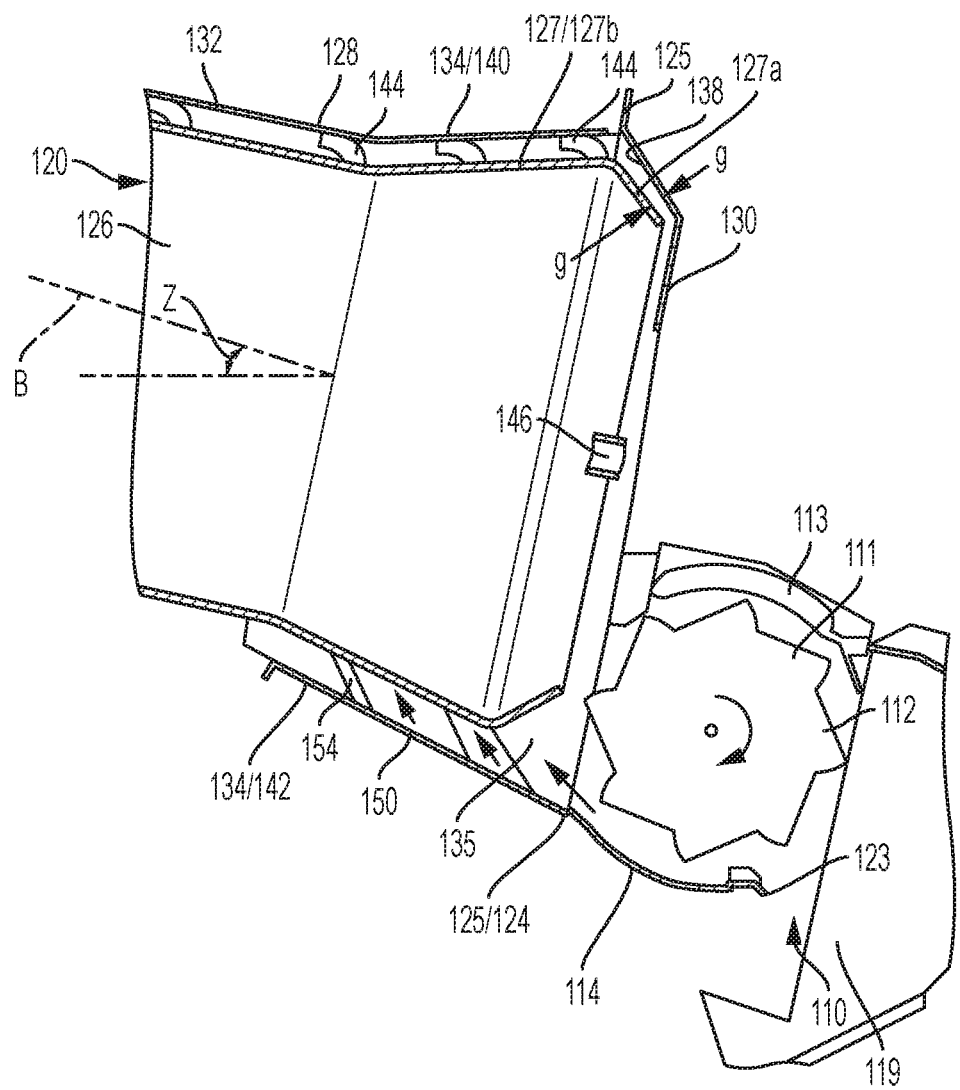
FIG. 2 is a truncated cross-sectional view of a crop feeding assembly and a rotor assembly according to one exemplary embodiment of the invention, wherein a swept profile of the rotor is shown.
Figure 3:
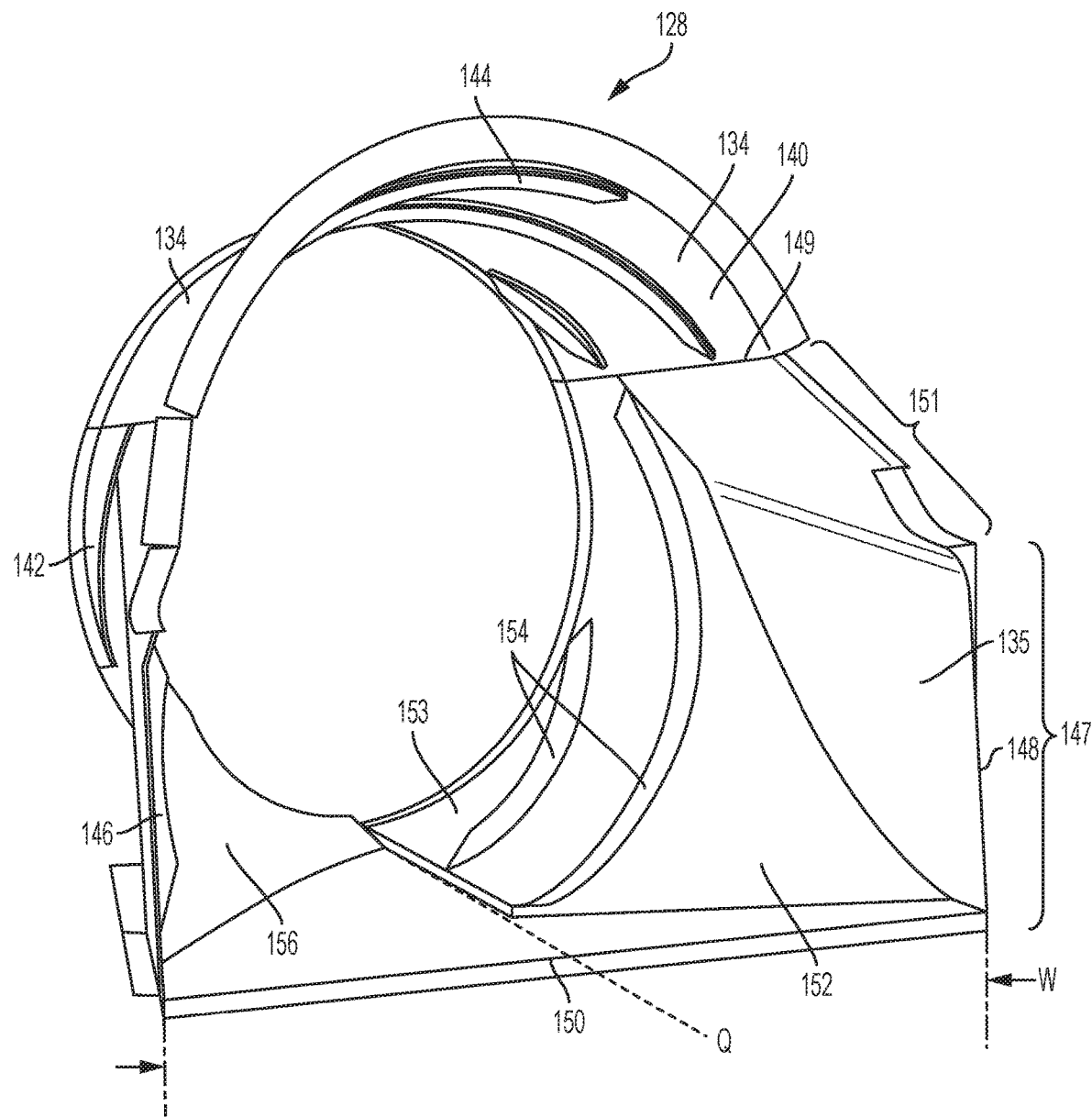
FIG. 3 is an isometric view of a transition housing of the rotor assembly of FIG. 2.
Figure 4A:
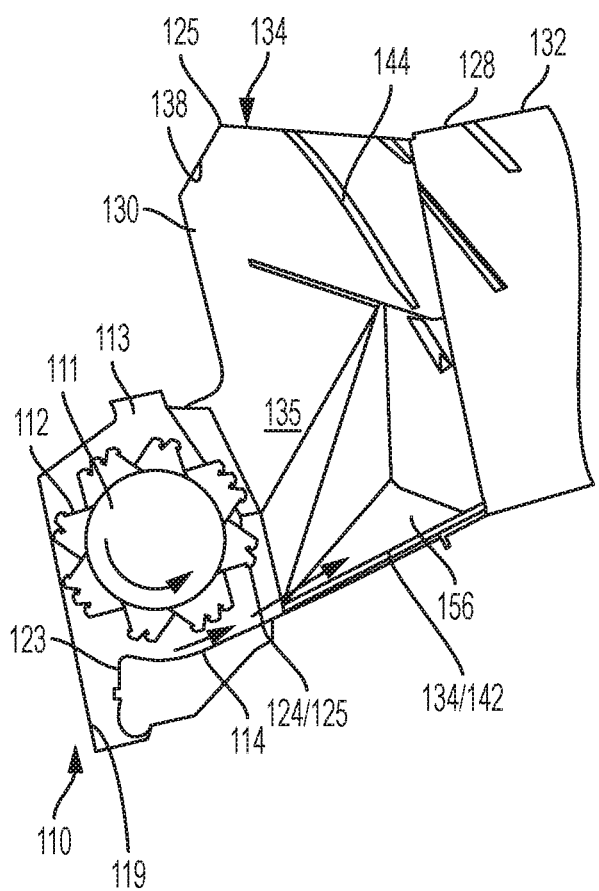
FIG. 4A is a truncated cross-sectional view of the assembly of FIG. 2, wherein the rotor has been omitted to reveal features of the transition housing.
Figure 4B:
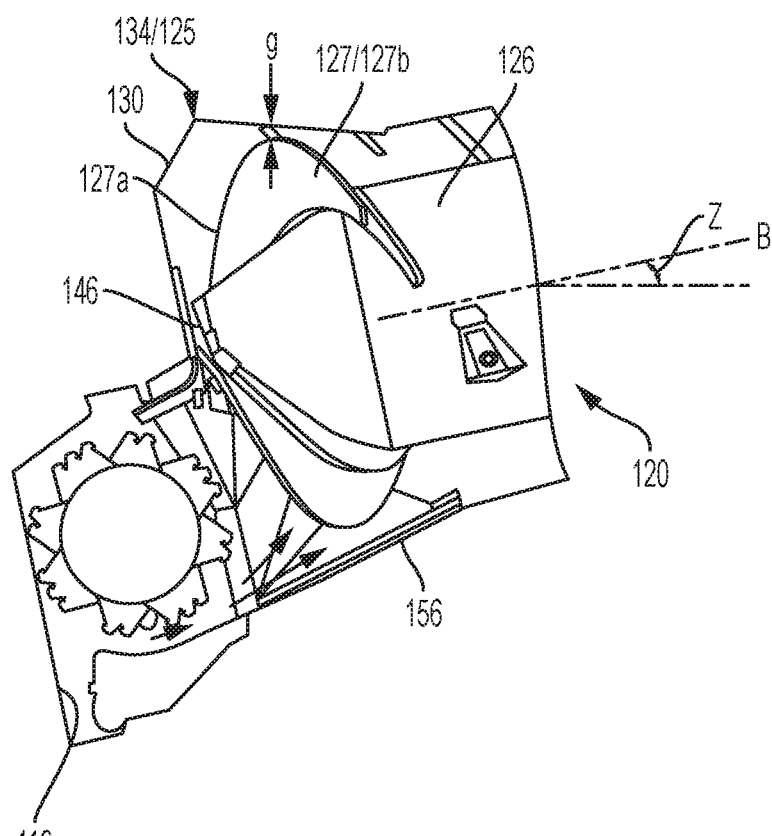
FIG. 4B is a truncated side elevation view of the assembly of FIG. 2, wherein features of the assembly are shown cut-away.
Figure 5A:
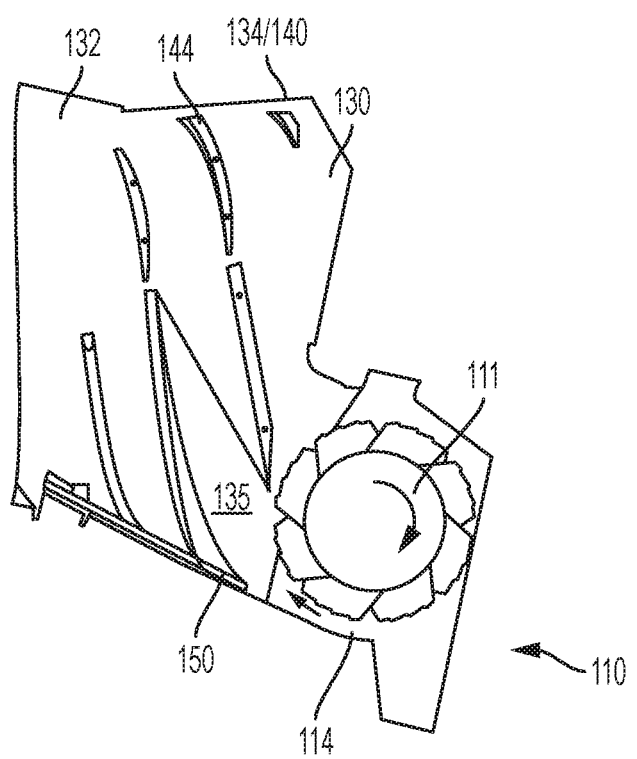
FIG. 5A is another truncated side elevation view of the sub-assembly of FIG. 4A, wherein features of the assembly are shown cut-away.
Figure 5B:
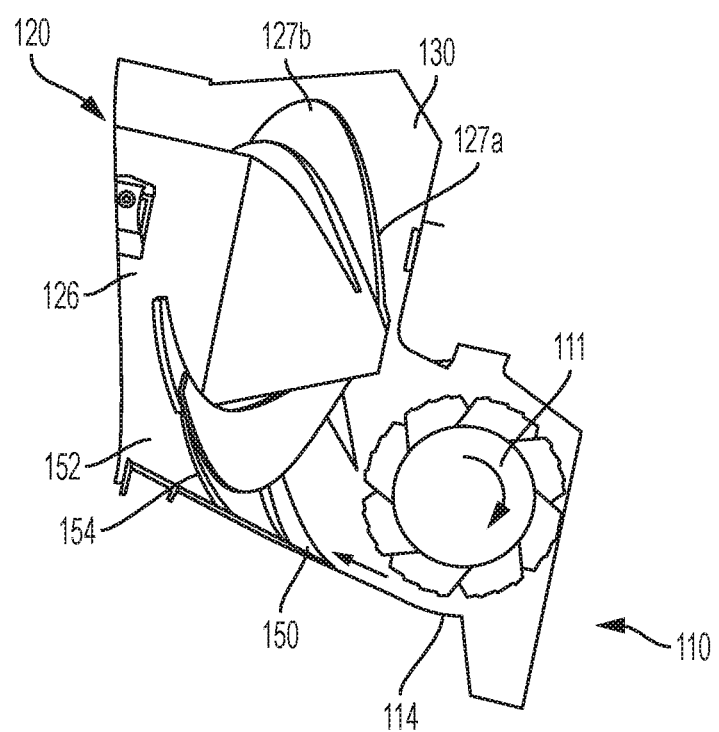
FIG. 5B is another truncated side elevation view of the assembly of FIG. 4B, wherein features of the assembly are shown cut-away.
Figure 6A:
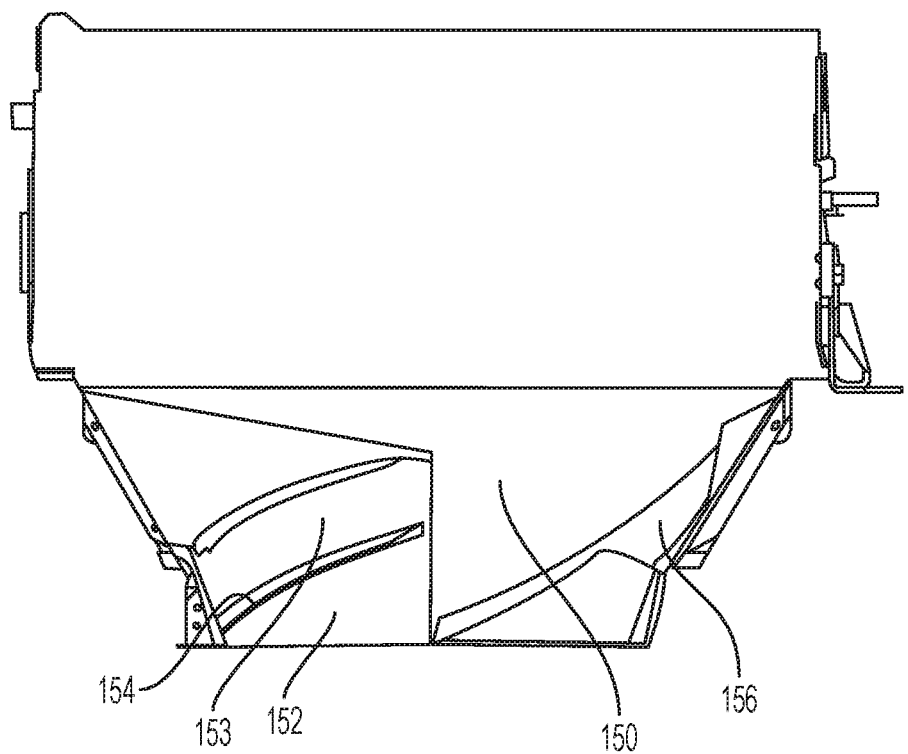
FIG. 6A is a truncated top plan view of the sub-assembly of FIG. 4A.
Figure 6B:
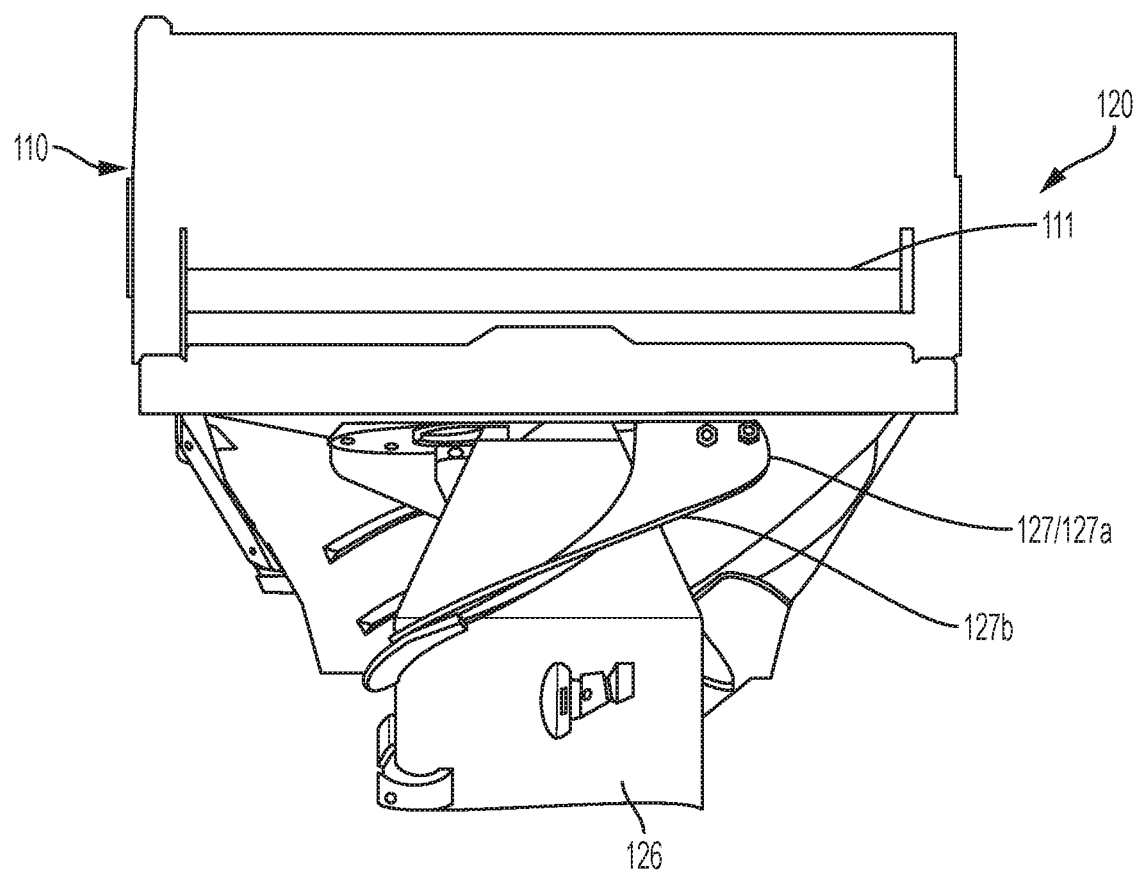
FIG. 6B is a truncated top plan view of the assembly of FIG. 4B.

The swept profile of the upstream end 127a of the impeller 127 of the rotor 126 is frusto-conical, as shown in FIG. 2. The swept profile of the upstream end 127a slopes outwardly away from the axis B as viewed in a fore-to-aft direction. The swept profile of the downstream end 127b of the impeller 127 is also conical. The downstream end 127b slopes inwardly toward the axis B as viewed in the fore-to-aft direction.

The conical geometry of the upstream end 127a of the impeller 127, which may be referred to as a reverse conic, provides room for crop material to travel beneath the rotor 126, which lends itself to even distribution of the crop material through the rotor assembly 120.

The rotor assembly 120 and the housing 128 for accommodating the rotor assembly 120 are oriented at an acute angle 'Z' with respect to a horizontal plane (e.g., the ground surface beneath the combine). Alternatively, the rotor assembly 120 and the housing 128 could be aligned with the horizontal plane.

Figure 7A:
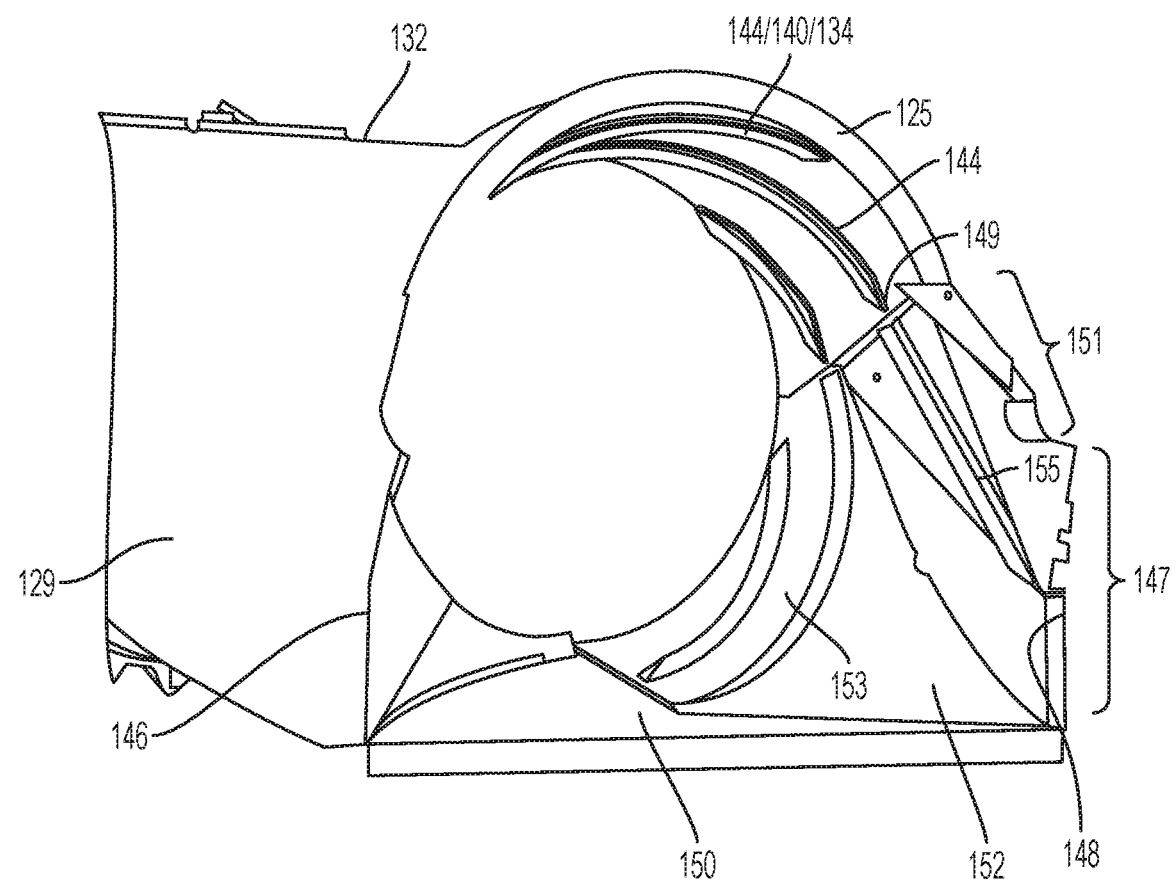
FIG. 7A is a truncated isometric view of the subassembly of FIG. 4A.

The rotor housing 128 includes a cylindrical wall 132 at its rearward end (also referred to as a rotor cage), a transition housing 134 (also referred to as a transition section) forward of the cylindrical wall 132, and a semi-cylindrical panel 130 extending across the top half of the upstream end 125 of the transition housing 134. The transition housing 134 surrounds the impeller 127 of the threshing rotor 126. The cylindrical wall 132 is positioned at an elevation above the concave 129, as shown in FIG. 7A.

The panel 130 has a conical shape that matches the swept profile of the forward end 127a of the rotor 126. Accordingly a gap 'g' is defined between the swept profile of the rotor 126 at the forward end 127a and the conical interior surface 138 of the panel 130. The gap 'g' could be a constant distance, a substantially constant distance, a distance that decreases in the downstream direction, or a distance that increases in the downstream direction.

The transition housing 134 includes an upper wall 140 and a collection of lower walls 142 (or surfaces). The walls 140 and 142 may be formed from one or more sheetmetal components, for example. For example, the walls 140 and 142 may be formed from two separate portions that are mounted together by either welds or bolts.

The upper wall 140 of the transition housing 134 is substantially frusto-conical and slopes inwardly toward the axis B of the rotor assembly 120 (as viewed in the fore to aft direction, i.e., the rearward direction). The upper wall 140 extends at or less than 180 degrees about the axis B. Alternatively, the upper wall 140 could extend greater than 180 degrees about the axis B. The interior surface of the upper wall 140 includes a plurality (three shown) of helical vanes 144 protruding from the interior surface for guiding the crop material into the threshing space between the rotor 126 and the rotor housing 128.

The lower walls 142 of the transition housing 134 comprise a partially rectangular inlet 135 that is defined by a first wall 146, a second wall 148 and a bottom wall 150 that interconnects the bottom ends of the walls 146 and 148. The walls 146 and 148 have a lower portion 147 and a top portion 151 that is positioned at an elevation above the lower portion 147.

The upstream end of the lower portion 147 of each wall 146 and 148 is substantially vertical whereas the bottom wall 150 is substantially horizontal and orthogonal with respect to each wall 146 and 148. The bottom wall 150 is substantially planar. The bottom wall 150 is positioned tangent to the downstream end 124 of the lower shroud 114 to ensure that crop material is transferred from the drum 111 into the rotor housing 128 in a uniform and efficient manner. The lower portion 147 of each wall 146 and 148 together with the bottom wall 150 form three sides of a rectangle, which defines the inlet 135.

The top portion 151 of each wall 146 and 148 is rounded and adjoins the top end of the upright lower portion 147 with the lower surface 149 of the upper wall 140. As best shown in FIG. 7A, a vane 155 is provided on the top portion 151 of the wall 148. The downstream end of the vane 155 adjoins the upstream of one vane 144 at the lower surface 149 of the upper wall 140. The vanes 155 and 144 together define a trajectory for directing crop material forward into the threshing section.

The width 'W' of the transition housing 134 is substantially equal to or greater than the width of the drum 111. Dimension 'W' also refers to the distance between the walls 146 and 148, as well as the width of the bottom wall 150. The width 'W' decreases in the downstream direction.

A curved wall 152 rises up from the bottom wall 150 to intersect the left side (as viewed with respect to the travel direction of the combine) of the upper wall 140 and the wall 148. The curved wall 152 has a substantially triangular sail shape, as viewed in FIG. 3. The top point of the triangle either contacts or is directly adjacent the upper wall 140. The curved wall 152 has a blended and swept geometry that is partially conical and partially cylindrical, for example. Although not necessarily shown, the wall 152 could be flat and planar, concave, convex, conical or curved without departing from the scope or spirit of the invention.

A conical wall 153 also rises up from a midline Q (FIG. 3) of the bottom wall 150 to intersect the left side of the upper wall 140 and a downstream edge of the curved wall 152. The conical wall 153 may form a continuous surface with the upper wall 140. The conical wall 153 is not limited to being a conical wall and may be more generally considered as a curved wall. Two helical vanes 154 are disposed on the conical wall 153 for guiding the crop material along the wall 153 and into the threshing space between the rotor 126 and the rotor housing 128.

Similarly, another curved wall 156 rises up from the bottom wall 150 to intersect the right side (as viewed with respect to the travel direction of the combine) of the upper wall 140 and the wall 146. The lowermost ends of the walls 153 and 156 also intersect each other. A vane 158 (FIG. 7B) is positioned on the wall 156.

Figure 7B:
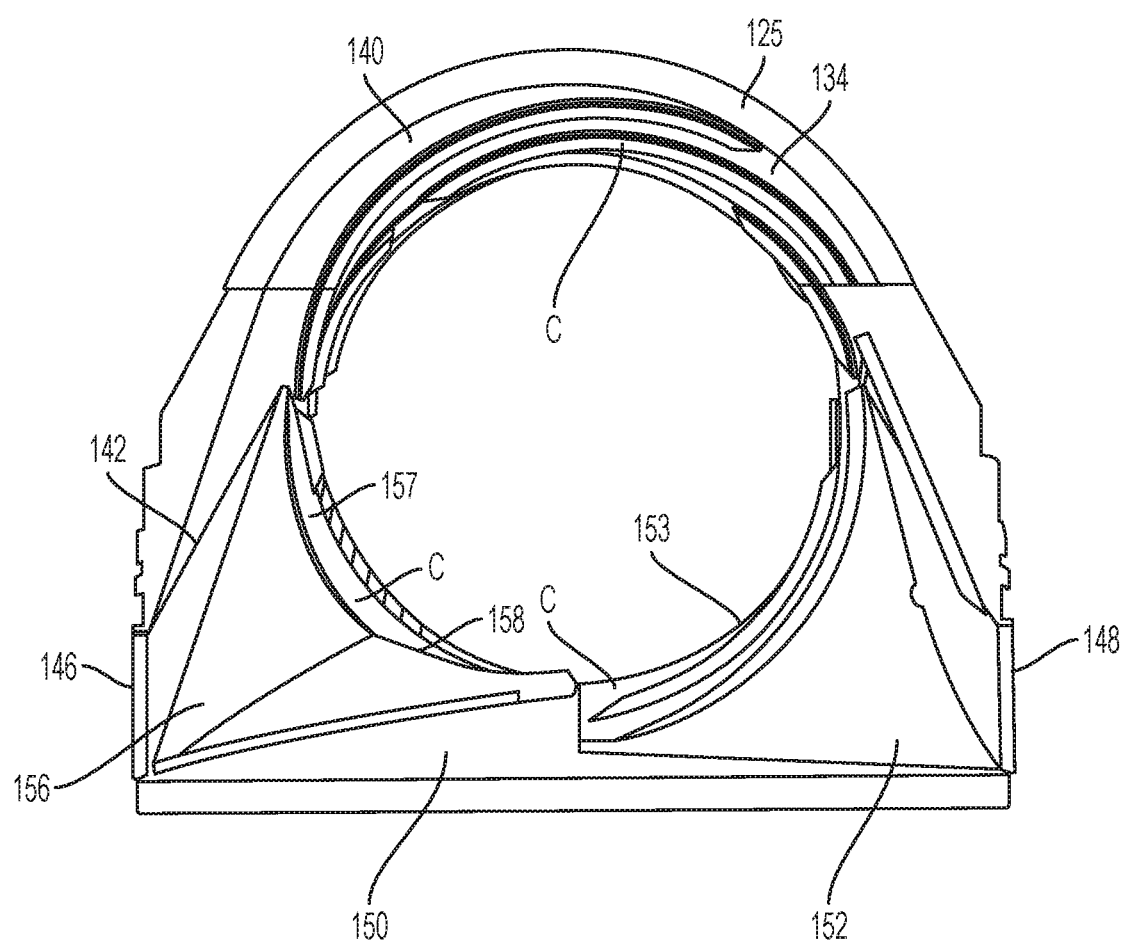
FIG. 7B is a front elevation view of the subassembly of FIG. 4A.

A conical wall 157 is positioned downstream of the curved wall 156. The conical wall 157 intersects the curved wall 156, the curved wall 153, and the upper wall 140. In FIG. 7B, the walls 157, 153 and 140 are marked with the designator 'C' to signify that those walls share the same or substantially the same conical surface. In other words, the walls 157, 153 and 140 form part of the same conical surface. That conical surface is tangential to the bottom wall 150. An angle between the bottom wall 150 and the rotor axis B may be greater than zero, such as 15 degrees, 27 degrees, or 40 degrees.

The walls 146, 148, 150, 152, 153, 156 and 157 may be formed from a single piece of sheetmetal, or, alternatively, those walls be formed separately and connected together by welds, for example.

The geometry of the inlet area 135 of the rotor housing 128 is particularly advantageous because it comprises gently sweeping curved and conical surfaces for smoothly transitioning the incoming crop material from the drum 111 and into the rotor housing 128. By smoothly transitioning the crop through the inlet area 135 of the rotor housing 128 less power is required for operating the rotor assembly 120. The profiles also allow the crop material to gain rotational acceleration before entering the threshing zone between the rotor 126 and the rotor cage 132. The inlet area 135 is devoid of sharp corners and steep walls that form dead zones in which the incoming crop material either does not enter or becomes lodged. If the crop material avoids a particular segment of a rotor housing inlet, then the incoming crop material becomes compacted, which can lead to overly dense crop mats, resulting in uneven and inefficient threshing.

In operation, the drum 111 distributes crop material uniformly across the bottom wall 150 of the rotor housing 128 and without restriction in the width-wise direction 'W', as depicted by the arrows in FIG. 2. The crop material is then smoothly transitioned in a counter clockwise direction (as viewed from the front of the combine) up the walls 152 and 153 along the vanes 154, and across the upper wall 140 along the vanes 144. The crop material then reaches the threshing zone between the rotor 126 and the rotor cage 132.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural combine harvester comprising:
a rotor,
a rotor cage surrounding the rotor,
a threshing space defined between the rotor cage and the rotor,
a transition section defining an infeed to said rotor cage, the transition section disposed at a location upstream of the rotor cage, as viewed in a direction of crop flow through the combine harvester, the transition section having an inlet for receiving the crop material, and
a crop conveying drum for conveying crop material to the inlet of the transition section and beneath the rotor, the drum being at least partially encased by a shroud,
wherein the transition section comprises a bottom wall, two side walls each having portions extending substantially vertically with respect to the bottom wall, curved side walls each extending between the bottom wall and one of the side walls, and a conical top wall extending between and connecting the curved side walls, the bottom wall being substantially tangential to a lower portion of the shroud located beneath the drum.

2. The agricultural combine harvester of claim 1, wherein the curved side walls are positioned downstream of an upstream edge of the bottom wall.

3. The agricultural combine harvester of claim 1, wherein an upstream edge of the bottom wall is attached to a downstream edge of the lower portion of the shroud.

4. The agricultural combine harvester of claim 1, wherein curved side walls are each at least partially conically shaped.

5. The agricultural combine harvester of claim 1, wherein at least a portion of a conveying space defined between the drum and the lower shroud is positioned at an elevation beneath the bottom wall.

6. The agricultural combine harvester of claim 1, wherein the bottom wall is flat and planar.

7. The agricultural combine harvester of claim 1, wherein the curved side walls are disposed on opposite sides of the transition section.

8. The agricultural combine harvester of claim 1, further comprising a concave positioned at an elevation beneath the rotor cage.

9. The agricultural combine harvester of claim 1, further comprising vanes disposed on one or more of the curved side walls and the conical top wall.

10. The agricultural combine harvester of claim 1, further comprising a conical side wall positioned downstream of one of the curved side walls, the conical side wall intersecting said one of the curved side walls, the bottom wall and the conical top wall.

11. The agricultural combine harvester of claim 1, wherein a width dimension of the bottom wall as measured along an axis is greater than a width dimension of the drum as measured along the axis.

12. A threshing system of an agricultural combine harvester comprising:
a rotor,
a rotor cage surrounding the rotor,
a threshing space defined between the rotor cage and the rotor, and
a transition section defining an infeed to said rotor cage, the transition section at a location upstream of the rotor cage, as viewed in a direction of crop flow through the threshing system, the transition section having an inlet for receiving crop material,
wherein the transition section comprises a bottom wall, two side walls each having portions extending substantially vertically with respect to the bottom wall, curved side walls each extending between the bottom wall and one of the side walls, and a conical top wall extending between and connecting the curved side walls.

13. The threshing system of claim 12, wherein the curved side walls are positioned downstream of an upstream edge of the bottom wall.

14. The threshing system of claim 12, wherein the bottom wall and the two side walls of the transition section form three sides of a rectangle such that the inlet of the transition section is substantially rectangular.

15. The threshing system of claim 12, wherein the side walls are each at least partially conically shaped.

16. The threshing system of claim 12, further comprising vanes disposed on one or more of the curved side walls and the conical top wall.

17. The threshing system of claim 12, further comprising a conical side wall positioned downstream of one of the curved side walls, the conical side wall intersecting said one of the curved side walls, the bottom wall and the conical top wall.

18. The threshing system of claim 12, wherein the bottom wall is flat and planar.

19. The threshing system of claim 12 further comprising a reverse conical wall connected to an upstream end of the conical top wall, the reverse conical wall extending away from a rotational axis of the rotor as viewed in a downstream direction and the conical top wall extending toward the rotational axis of the rotor as viewed in the downstream direction.

\* \* \* \* \*